(12) United States Patent
Stahl

(10) Patent No.: US 9,413,274 B2
(45) Date of Patent: Aug. 9, 2016

(54) WIND ENERGY INSTALLATION

(71) Applicant: Stefan Stahl, Mettenheim (DE)

(72) Inventor: Stefan Stahl, Mettenheim (DE)

(*) Notice: Subject to any disclaimer, the term of this patent is extended or adjusted under 35 U.S.C. 154(b) by 90 days.

(21) Appl. No.: 13/941,658

(22) Filed: Jul. 15, 2013

(65) Prior Publication Data

US 2014/0015375 A1    Jan. 16, 2014

(30) Foreign Application Priority Data

Jul. 16, 2012 (DE) .......................... 10 2012 014 088

(51) Int. Cl.
| | | |
|---|---|---|
| *F03B 13/00* | (2006.01) | |
| *H02N 1/00* | (2006.01) | |
| *H02N 3/00* | (2006.01) | |

(52) U.S. Cl.
CPC ..................................... *H02N 3/00* (2013.01)

(58) Field of Classification Search
CPC ..................................................... H02N 3/00
USPC .......... 290/54, 43, 55; 310/308, 309; 322/2 A
See application file for complete search history.

(56) References Cited

U.S. PATENT DOCUMENTS

| | | | | |
|---|---|---|---|---|
| 3,054,553 A | * | 9/1962 | White ....................... | 315/111.91 |
| 3,582,694 A | * | 6/1971 | Gourdine ....................... | 310/10 |
| 3,699,387 A | * | 10/1972 | Edwards ....................... | 361/230 |
| 3,792,293 A | * | 2/1974 | Marks .......................... | 310/308 |
| 4,146,800 A | | 3/1979 | Gregory et al. | |
| 4,206,396 A | | 6/1980 | Marks | |
| 8,421,047 B2 | * | 4/2013 | Carmein et al. .............. | 250/573 |
| 2012/0211989 A1 | | 8/2012 | Carmein et al. | |

FOREIGN PATENT DOCUMENTS

| | | |
|---|---|---|
| DE | 639 000 A | 11/1936 |
| DE | 103 60 876 A1 | 9/2005 |

* cited by examiner

*Primary Examiner* — Julio C. Gonzalez R.
(74) *Attorney, Agent, or Firm* — ProPat, L.L.C.

(57) ABSTRACT

A method for directly converting wind energy into electrical energy is provided. An air stream is ionized and then routed through the electrical field of a collection electrode providing an opposing field for the air ions. The ions are collected on a collection electrode. The electrical potential of the collection electrode is higher than the ionizer, and discharged. A counter-electrode in front of the collection electrode has an electrical potential higher than the collection electrode. Ionized air molecules overcome the electrical field emanating from the counter-electrode via wind power. An apparatus for carrying out the method is provided. An optional retaining electrode, located in front of the ionizer electrode, drives ionized air in the counter-electrode and collection electrode direction. The apparatus is expediently located in a flow channel, with inlet and outlet electrodes at respective ends. A plurality of flow channels combine to form a flow generation module.

12 Claims, 3 Drawing Sheets

WIND ENERGY INSTALLATION

CROSS-REFERENCE TO RELATED APPLICATIONS

This application claims priority to German Patent Application 10 2012 014 088.6 filed Jul. 16, 2012, which is hereby incorporated herein by reference in its entirety.

FIELD OF THE INVENTION

The invention relates to a method for directly converting wind energy into electrical energy, in which method air in an air stream is ionized with the aid of an ionizer, the air stream is routed through an electrical field which acts as an opposing field for ions in the air, and in which method the ions are collected on a collection electrode, the electrical potential of the said collection electrode being higher than that of the ionizer, and discharged. The corresponding apparatus for directly converting wind energy into electrical energy does not have any moving parts (solid-state wind turbine).

BACKGROUND OF THE INVENTION

Conventional wind energy installations generally comprise a rotor which is made to rotate by wind, wherein the rotary movement is converted into electrical energy with the aid of an electrical generator. Rotors of this kind often have a height of 60 m or more, with the result that they have a considerable adverse effect on the landscape. Rotors of wind power installations of this kind additionally create a considerable amount of noise, this precluding them from being located in the immediate vicinity of residential buildings.

U.S. Pat. No. 4,146,800 describes a method for directly converting wind energy into electrical energy. The associated apparatus does not have any mechanically moving parts. Ions are generated in the said apparatus, in particular by corona discharge, the said ions then being moved by the wind against the resistance of an electrostatic field. Finally, electric current is generated as a result. The method has the disadvantage that only a small proportion of the generated ions strike the ground, which acts as the collection electrode, at a sufficiently short distance in order to be discharged there. Accordingly, the current flow which is caused by the ions and the efficiency of energy recovery are low and depend to a great extent on the conductivity of the surrounding ground and the spatial conditions in the vicinity of the apparatus. The emission of large quantities of chemically reactive ions into the immediate surroundings is also problematic from environmental-protection aspects and the effects thereof over relatively long periods of time are unexplored. Since insulating materials are electrostatically charged in the kV range in the region of several metres from the installation, there is a considerable risk of electric shock to humans and animals, this making it impossible to operate installations of this kind in urban areas. The ions also pass through a repulsive potential emanating from the collection electrode in embodiments of the method according to U.S. Pat. No. 4,146,800 in which a separate collection electrode is used instead of the ground. Therefore, a large portion of the ions is repelled by the collection electrode and discharged at another point, with the result that it does not contribute to energy recovery.

SUMMARY OF ADVANTAGEOUS EMBODIMENTS OF THE INVENTION

The object of the invention is therefore to provide an apparatus for converting wind energy into electrical energy, which apparatus does not have the said disadvantages. Said apparatus should produce hardly any noise and have an only low space requirement, so that it can also be installed on housing facades or on housing roofs. The object is particularly that of improving the apparatus described in U.S. Pat. No. 4,146,800 and the method disclosed in said document.

The object is achieved by ionizing air, wherein the ions are moved through the opposing electric field of a counter-electrode by the wind. The corresponding apparatus manages without moving parts (solid-state wind turbine).

DETAILED DESCRIPTION OF ADVANTAGEOUS EMBODIMENTS OF THE INVENTION

Figure 1:
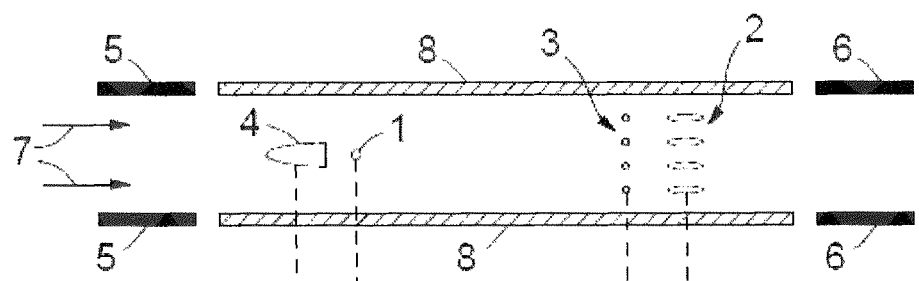
FIG. 1 is a schematic illustration of an exemplary inventive apparatus.

The subject matter of the invention is therefore a method for directly converting wind energy into electrical energy, in which method electrically charged molecules are generated and injected into the surrounding air which is then moved through an electrostatic opposing field of a collection electrode by the wind and again discharged on the collection electrode and therefore drawn from the air for the most part, characterized in that a counter-electrode is arranged in front of the collection electrode in the direction of the flow of air, the electrical potential of the said counter-electrode being set such that it is higher than that of the collection electrode but can still be overcome by the electrically charged molecules with the aid of the wind energy.

On the collection electrode, the ions again emit the energy obtained in the opposing electrical field. When the ions have passed through the electrical field of the counter-electrode, the collection electrode has an attracting effect on them.

Therefore, a significantly higher proportion of the ions is used for current generation than in the method according to U.S. Pat. No. 4,146,800. The electrical power $P=U_D \cdot I$ obtained as a result is given by the potential difference $U_D$ and the electrical current I resulting from the discharge process.

The power can be maximized by a controlled electronic power optimizer (Maximum Power Point (MPP) tracker) which varies the applied voltages analogously to the use in photovoltaic installations. In this case, the opposing electrical field is controlled in accordance with the wind speed. The stronger the wind, the more intense the opposing field can be and the more electrical energy can be obtained.

In the simplest embodiment, the apparatus according to the invention accordingly comprises an ionizer with which air molecules can be ionized, a collection electrode which is arranged behind the said ionizer in the wind direction and which generates an opposing electrical field, and at least one counter-electrode. The counter-electrode is arranged in front of the collection electrode—in the direction of the flow of air. The said counter-electrode is connected to an electrical potential $U_G$ which is higher than the potential $U_S$ of the collection electrode. The counter-electrode is designed, for example, as a bar or lattice. After passing the counter-electrode, the ions experience an attracting force which emanates from the potential $U_S$ of the collection electrode.

The ionizer preferably comprises at least one thin metal wire, as is also used when generating corona discharges. The wire preferably has a round cross section and a thickness of 0.05 to 1 mm. It is also possible to generate a corona discharge on a metal edge or blade with a smaller radius of curvature. Corona treatments are known, for example, from the production of plastic films. A permanent or intermittent corona gas discharge is generated on the wire or the metal edge/blade by a DC or AC voltage $U_I$. The voltage required for this is typically 1 to 10 kV. The ions can also be generated by a dielectric barrier discharge which is operated, for example, by applying a permanent or intermittent high-frequency, for example ISM frequency 13.56 megahertz, amplitude in the region of 1 kV. Furthermore, free electrons which then ionize air molecules can be generated with a spray wire. In addition to the said electrically operated ionizers, UV radiation or other high-energy radiation can assist the ionization of the air.

In contrast, the collection electrode is preferably designed in the form of a lattice. The distance between the ionizer and the collection electrode is expediently approximately 5 to 20 cm, in particular approximately 10 cm. On the collection electrode, the ions again emit energy obtained in the opposing field and are largely neutralized. To this end, they have a relatively large surface. In order to nevertheless keep the air resistance low, the elements which make up the collection electrode preferably have an oval shape, as is schematically illustrated in FIG. 1 below.

FIG. 1 shows an embodiment having an ionizer 1, a collection electrode 2, a counter-electrode 3, a retaining electrode 4, and earthed inlet and outlet electrodes 5 and 6. The arrows 7 indicate the direction of flow of the air. The electrodes are arranged in a flow channel 8.

Figure 2:
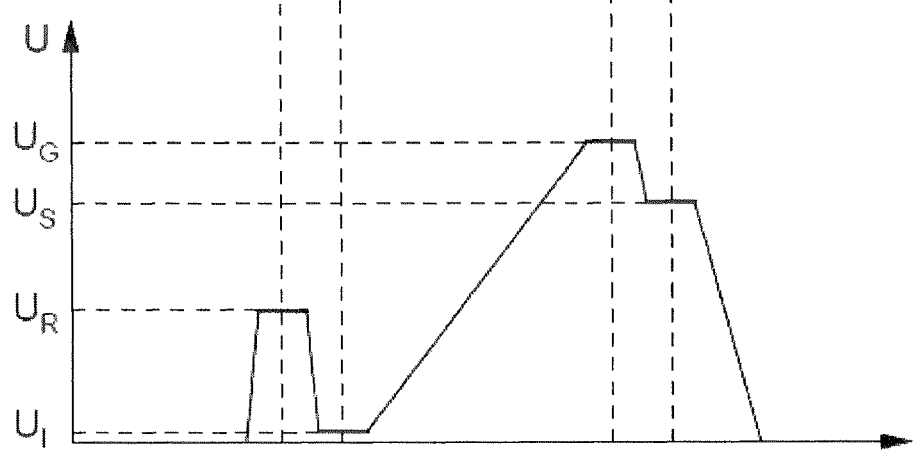
FIG. 2 is a graphical illustration of the electrical potential within the exemplary inventive apparatus.

FIG. 2 illustrates the electrical potential of the respective electrodes.

The electrical currents and voltages which can be used to recover energy are applied between the ionizer and the collection electrode (potential difference $U_D=U_S-U_I$) and are supplied to an electrical converter. The said converter converts the current into conventional alternating or three-phase current. In addition, the converter has the task of supplying the respectively required voltage to all the electrodes present on the apparatus according to the invention. The voltages are expediently automatically optimized (MPP tracking).

Figure 3:
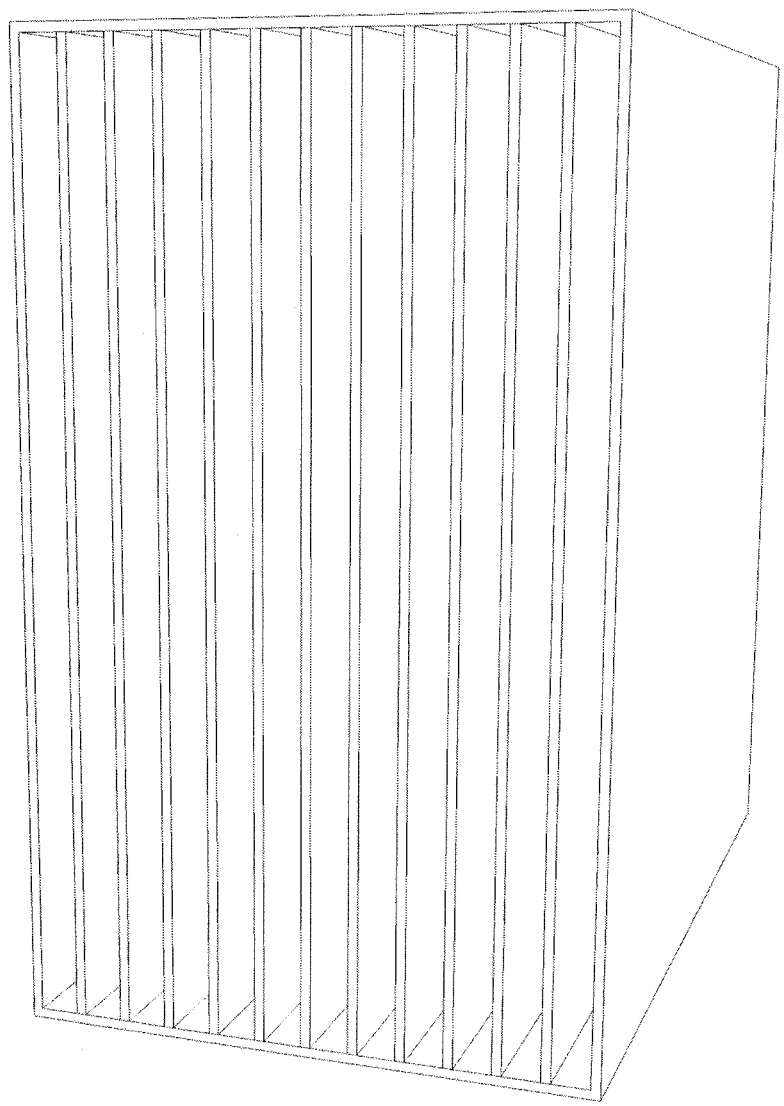
FIG. 3 is a schematic illustration of a perspective view of an exemplary module containing a plurality of air channels with electrodes.
Figure 4:
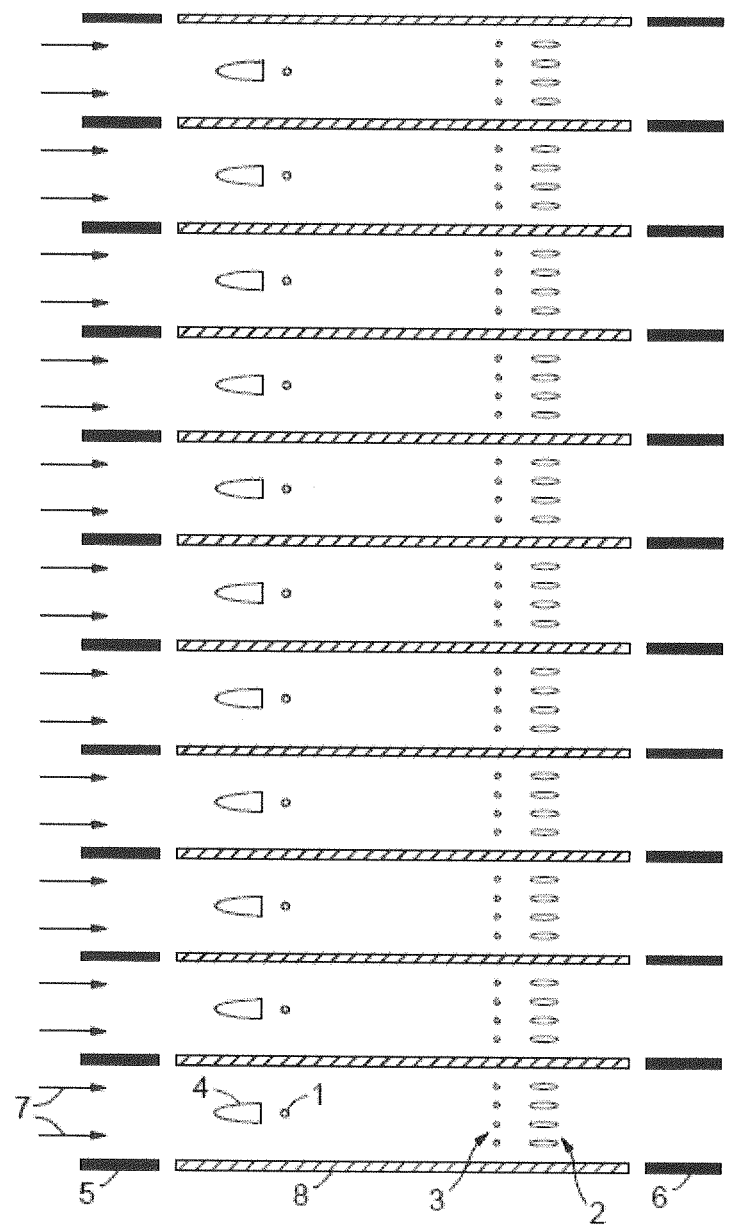
FIG. 4 is a schematic illustration of a top view of an exemplary module containing a plurality of air channels with electrodes.

Furthermore, it has proven expedient to arrange the electrodes in a flow channel, also referred to as an air channel. This channel generally has a rectangular cross section in order to be able to use electrodes which are as long as possible. The length of the channels is generally approximately 1 to 50 cm, preferably 5 to 30 cm, particularly preferably 8 to 20 cm. Materials which are inert to ionized air molecules are expediently selected for the apparatus according to the invention. The walls of the flow channel can be comprised of insulating, weakly electrically conductive or metallic material which can be subdivided several times in order to assist the generation of ions and the movement of ions within the channel by way of suitable electrical potentials. Stainless steel is a suitable example. In addition, earthed inlet and outlet electrodes are expediently located at the ends of the flow channel. These electrodes prevent ions emerging from the flow channel, in particular those ions which have not yet been discharged to the collection electrode. A plurality of the described air channels which are provided with electrodes can be arranged next to one another and/or one above the other without problems. FIG. 3 illustrates a module of this kind with a plurality of channels which are arranged next to one another. FIG. 4 schematically shows the module from above. The reference numerals in FIG. 4 have the same meaning as in FIG. 1.

In a preferred embodiment, the apparatus according to the invention further comprises at least one retaining electrode. The retaining electrode is arranged immediately in front of the ionizer electrode—as seen in the wind direction. The retaining electrode is preferably connected to an electrical potential $U_R$ which repels the ionized air molecules which are generated on the ionizer and deflects them in the direction of the collection electrode. Independently of this, the retaining electrode can be designed to be so stable that it protects the ionizer electrode against mechanical damage, as may be caused, for example, by plant leaves or insects.

The counter-electrode is designed, for example, in the form of a bar or lattice. It has a potential $U_G$ which is higher than the potential $U_S$ of the collection electrode. After passing the counter-electrode, the ions therefore experience an attracting force which emanates from the potential $U_G$ of the collection electrode.

FIG. 2 illustrates the electrical potential of the individual electrodes. The illustration relates to positively charged air molecules. The polarity of all voltages has to be inverted for operation of the apparatus with negatively charged ions. Typical operating voltages lie in the single-digit kV range with a channel length of approximately 5 to 10 cm. They scale substantially linearly with the channel length, that is to say the voltages increase the longer the channel.

All electrodes are expediently designed such that they have as little an adverse effect on the flow of air as possible. The apparatus according to the invention can be designed to be rotatable, so that the wind can flow through in an optimum manner.

The electrodes can be arranged with mirror-image symmetry with respect to the collection electrode. In this case, a further ionizer electrode, possibly also a further retaining electrode and/or a further counter-electrode are present. A refinement of this kind is particularly expedient when the apparatus is permanently installed. The air can then flow in from one side or the other side and in both cases generate electrical current. As an alternative, the counter-electrode 3 can be used as an ionizer, the ionizer 1 can be used as a counter-electrode and the retaining electrode 4 can be used as a collection electrode.

That which is claimed:

1. Apparatus for directly converting wind energy into electrical energy comprising at least one electrode for ionizing air in a flow of air having a direction and at least one collection electrode, an electrical potential of said collection electrode being higher than that of the electrode for ionizing the air and said collection electrode generating an electrical field which counteracts ionized air molecules but is overcome by the ionized air molecules via wind energy, and a means for diverting current generated by voltage produced in the apparatus, wherein a counter-electrode is arranged in front of the collection electrode in the direction of flow of the ionized air, the electrical potential of said collection electrode being higher than that of the electrode for ionizing air, and the electrical potential of said counter electrode being higher than the electrical potential of both the electrode for ionizing air and the collection electrode.

2. Apparatus according to claim 1, wherein at least one retaining electrode is fitted in front of the at least one electrode for ionizing air in the upstream direction of the flow of air, the electrical field of said retaining electrode repelling ionized air molecules and deflecting them in the direction of the collection electrode.

3. Apparatus according to claim 1, wherein all of the electrodes are arranged in a flow channel.

4. Apparatus according to claim 3, wherein earthed inlet and outlet electrodes are located at ends of the flow channel.

5. Apparatus according to claim 1, wherein the electrode for ionizing air and the counter-electrode are arranged with mirror-image symmetry with respect to a plane of the collection electrode.

6. Method for directly converting wind energy into electrical energy in an apparatus as claimed in claim 1, said method comprising
ionizing air in an air stream with an ionizer,
routing the air stream through the electrical field of a collection electrode acting as an opposing field for ions in the air, and collecting the ions on the collection electrode, the collection electrode having an electrical potential that is higher than that of the ionizer, and discharging,
wherein said method further comprises initially passing the ions through an electrical field of a counter-electrode which is fitted in front of the collection electrode and setting the counter-electrode electrical potential such that the electrical potential is higher than that of the collection electrode, with the ionized air molecules overcoming the electrical field emanating from the counter-electrode with the aid of the wind power.

7. Method according to claim 6, wherein the air is ionized by corona discharge, dielectric barrier discharge or with an electrical spray wire.

8. Method according to claim 6, wherein a retaining electrode is fitted in front of the ionizer, and the method further comprises setting the electrical field of said retaining electrode to repel and deflect ionized air molecules in the direction of the collection electrode.

9. Method according to claim 6, wherein said method further comprises routing the air stream through a flow channel in which at least one ionizer, at least one collection electrode, optionally at least one retaining electrode and optionally at least one counter-electrode are arranged.

10. Method according to claim 6, wherein said method further comprises controlling the potentials of the counter-electrode and the collection electrode in accordance with the intensity of the flow of air.

11. Apparatus for directly converting wind energy into electrical energy comprising at least one electrode for ionizing air in a flow of air having a direction and at least one collection electrode, and a means for diverting current generated by voltage produced in the apparatus, the electrical potential of said collection electrode being higher than that of the electrode for ionizing air,
wherein a counter-electrode is arranged in front of the collection electrode in the direction of flow of the ionized air; the electrical potential of said counter electrode being higher than the electrical potential of both the electrode for ionizing air and the collection electrode, with the electrical potential of said counter-electrode set such that the electrical potential of the counter-electrode can be overcome by the electrically charged molecules with the aid of the wind energy resulting in a higher proportion of the ions being used for current generation.

12. Apparatus according to claim 1, wherein said counter electrode is bar- or lattice-shaped.

* * * * *